(No Model.) 2 Sheets—Sheet 1.
G. LEUFFGEN.
DEVICE FOR HOLDING AND SHAPING GLASSWARE.
No. 313,346. Patented Mar. 3, 1885.

Witnesses. Inventor.

(No Model.) 2 Sheets—Sheet 2.
G. LEUFFGEN.
DEVICE FOR HOLDING AND SHAPING GLASSWARE.
No. 313,346. Patented Mar. 3, 1885.
Fig. 4.
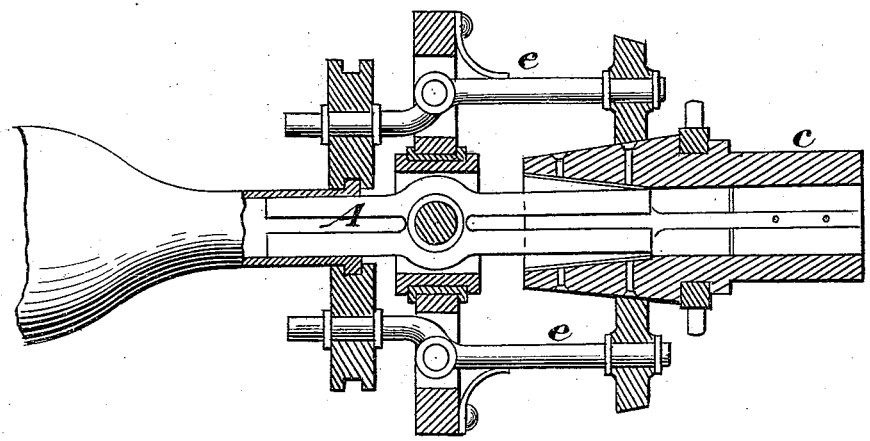
Fig. 5.
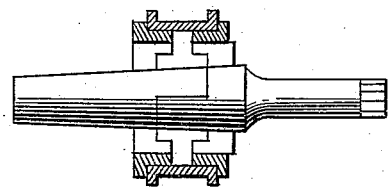
Fig. 6. Fig. 7.
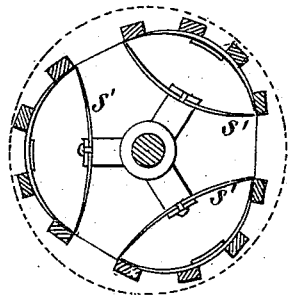 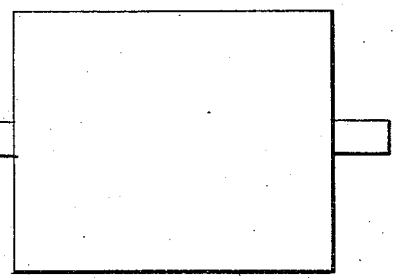
Fig. 8.
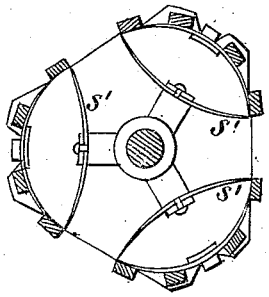
Witnesses.
A. Clay Smith
Charles R. Searle
Inventor.
Georges Leuffgen
By his Atty.
Thomas D. Stetson

UNITED STATES PATENT OFFICE.

GEORGES LEUFFGEN, OF BERLIN, ASSIGNOR TO CHRISTIAN AUGUST WILHELM SCHÖN, OF HAMBURG, GERMANY.

DEVICE FOR HOLDING AND SHAPING GLASSWARE.

SPECIFICATION forming part of Letters Patent No. 313,346, dated March 3, 1885.

Application filed June 25, 1881. (No model.) Patented in England April 26, 1881, No. 1,795; in Belgium May 25, 1881, No. 54,730; in Italy June 30, 1881, No. 13,111; in Sweden July 20, 1881; in Spain September 19, 1881, No. 1,667; in Austria October 7, 1881, No. 14,917; in Denmark October 7, 1881, No. 875; in France November 25, 1881, No. 146,029, and in Norway December 16, 1881.

*To all whom it may concern:*

Be it known that I, GEORGES LEUFFGEN, of Berlin, Kingdom of Prussia, German Empire, have invented certain new and useful Improvements in Devices for Holding and Shaping Glassware, of which the following is a specification.

My invention relates to an improved construction of a device adapted for grasping hot glass articles and holding them stationary, or turning upon them and giving them shape both inside and outside, or either. The essential features are arms which are moved upon inclines, and thus caused to force together the parts attached to the inclines, or release them and allow them to be opened by a spring or otherwise. In the application to apparatus for shaping the article clasped, rollers are provided on the outside and a mold or mandrel on the inside, and both of these are made adjustable. The operation of the arms which move upon the inclines is controlled from a handle or shaft by means of a screw or lever, and the inside variable mandrel may be controlled by the same means.

The accompanying drawings form a part of this specification, and illustrate the invention as applied in various situations.

Figure 1:
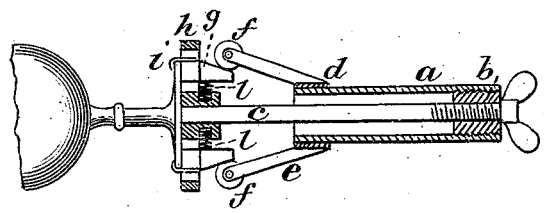
Figure 2:
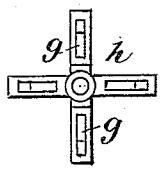
Figure 3:
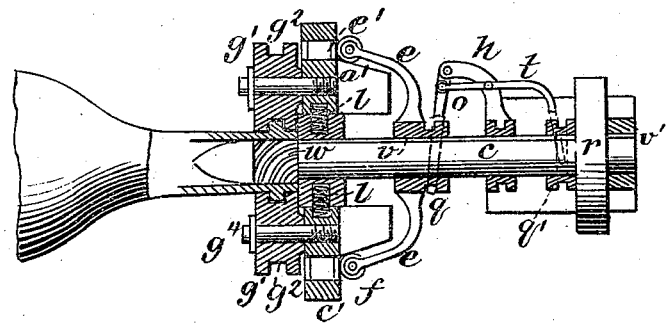

Figure 1 is a longitudinal section showing the device used as a holder; Fig. 2, a detail of the cross-head; Fig. 3, a longitudinal section of the device in service to form the neck of a bottle. Fig. 4 is a modification embodying the same principle, and Figs. 5, 6, 7, and 8 are details.

Similar letters of reference indicate corresponding parts in all the figures.

In carrying out the invention as applied to a device for grasping and holding articles of hot glass alone, I use a piece of iron pipe, $a$, internally screw-threaded at one end, into which is screwed a nut, $b$, which may have an extension as long as the pipe. A spindle, $c$, inserted through the nut and pipe, engages by screw-threads with the nut.

At the front end of the pipe $a$ a hub, $d$, is secured, to which are attached inclined divergent arms $e$, bearing small rollers $f$ at their outer ends. These rollers bear upon inclines $g$, whose lower ends work in slots in the cross $h$, which is fixed to the spindle $c$. Opening means $l$ are attached to the inclines $g$, and may be springs, which will automatically draw the inclines out when the rollers are drawn back. Claws $i$, to take hold upon the article to be held, are attached to the inclines and extend through the slots upon the front of the cross. As the handle or pipe $a$ is turned down by the nut $b$, the rollers $f$ on the arms $e$ will force the inclines inward, and will cause the clamps $i$ to grasp anything which may be presented to them. Then as the handle is turned back the inclines are released and the claws quit their hold upon the article. The foot of a goblet or vase is shown in the drawings as being held by the clamps. The hollow handle or pipe $a$ also serves as a check for the transmission of heat to the hand. The claws may be extended into long arms, curved or straight, if desired, so as to take hold upon articles which the short claws would not catch. The spring $l$ throws the claws apart when the inclines are released from the rollers, and the claws will be automatic in releasing their hold, and will hold the inclines apart when the tongs are out of use.

In the device adapted to be rotated and to shape the necks of bottles constructed on the principle of this invention the shaft $c$ is turned by hand, or by power, preferably applied through a belt working on the pulley $r$. A pillow-block, $a'$, is fixed in the cross-head $c'$, which has slots $e'$, receiving the bases of the inclines $g$ forced out by springs $l$. The inclines are provided with short trunnions or studs $g^4$, on which revolve the forming-rollers $g'$, which have circumferential groove or grooves $g^2$, which shape the ridges around the outside of the bottle-neck. These rollers being attached to the inclines, move in and out with them. The inclines are brought together by small rollers $f$ on the ends of the arms $e$. The arms $e$ are attached to a sleeve, $q$, which moves on the shaft $c$, operated by the lever $o$, swung from the fixed arm $p$, working in a groove in the sleeve $q$. By shifting the sleeve $q$ the inclines are drawn together or released by the operation of the arms $e$ and rollers $f$. The inside of the mouth may be corrugated by the introduction of a movable ring, w, the form of which may be changed as desired. Screw-threads may be thus formed. A connecting-rod, v, extends back from this ring in the groove v' in the shaft c, and is attached to the sleeve q', which is operated by a lever, t, pivoted to the same arm, p, to which the lever o is pivoted, and controlled by a suitable connection with the lever o, so that the ring w will act in unison with the roller g', being pushed into position in the bottle's mouth when they are drawn up, and pulled out when they are released. The impression is to be made by squeezing the rollers down upon the neck of the bottle while it is still impressible. The shaft c may have the inclines upon it, as shown in Fig. 5, and the levers e be pivoted centrally and provided with springs, and equipped at one end with the forming-rollers and at the other with the bearing-rollers. An expanding-mandrel or variable mold, A, which may be operated to round out the form and allow for shrinkage, is inserted in the neck of the bottle. The mold may be made to act automatically. An enlarged form of such a mold is shown in Figs. 7, 8, and 9. A framing, z, of essentially circular form, covered with wire, if desired, is spread out by springs s', which allow it to be contracted as the glass shrinks or pinches upon it. A central core with arms extending laterally supports the springs. This mandrel may be provided on the exterior with the ridges or threads like w, and will possess sufficient inelasticity to impress the interior of the neck.

I am aware that inclines and rollers have been before used in machines for shaping bottle-necks, but such features are not sought to be broadly covered in this application.

Having thus described my invention, what I desire to claim is—

1. In combination with the rod c, having cross-head h, with slots, and the divergent arms e, having rollers f, the inclines g and springs l, as and for the purposes set forth.

2. The inclines g and rollers g', having annular grooves $g^2$, combined with the arms e, having rollers f, the shaft c, having former w, and means for operating said arms e, as set forth.

This specification signed by me this 3d day of February, 1881.

GEORGES LEUFFGEN.

Witnesses:
CARL T. BURCHARDT,
CHR. AUG. W. SCHÖN.